United States Patent
Jo et al.

(10) Patent No.: US 9,786,181 B2
(45) Date of Patent: Oct. 10, 2017

(54) AUTONOMOUS VEHICLE AND CONTROL METHOD THEREOF

(71) Applicant: Hyundai Motor Company, Seoul (KR)

(72) Inventors: Won Jin Jo, Hwaseong-si (KR); Hyoung Geun Kwon, Seongnam-si (KR); Tae Won Lim, Seoul (KR); Changjae Lee, Yongin-si (KR); Seokyoul Yang, Incheon (KR)

(73) Assignee: Hyundai Motor Company, Seoul (KR)

( * ) Notice: Subject to any disclaimer, the term of this patent is extended or adjusted under 35 U.S.C. 154(b) by 15 days.

(21) Appl. No.: 14/922,443

(22) Filed: Oct. 26, 2015

(65) Prior Publication Data

US 2016/0328976 A1 Nov. 10, 2016

(30) Foreign Application Priority Data

May 6, 2015 (KR) .......................... 10-2015-0063361

(51) Int. Cl.
*F02D 41/40* (2006.01)
*G08G 1/00* (2006.01)
*B60W 30/182* (2012.01)
*B60W 10/06* (2006.01)
(Continued)

(52) U.S. Cl.
CPC ............. *G08G 1/202* (2013.01); *B60W 10/06* (2013.01); *B60W 30/182* (2013.01); *F02D 29/02* (2013.01); *F02D 41/403* (2013.01); *F02D 41/029* (2013.01); *F02D 41/405* (2013.01);
(Continued)

(58) Field of Classification Search
CPC .......................... F02D 41/403; B60W 30/182
See application file for complete search history.

(56) References Cited

U.S. PATENT DOCUMENTS

2007/0112502 A1   5/2007 Asano et al.
2013/0073186 A1*  3/2013 Morinaga ........... F02D 13/0207
                                                       701/104
(Continued)

FOREIGN PATENT DOCUMENTS

JP    2001001787      1/2001
JP    2015-035181     2/2015
KR    100569314       4/2006
(Continued)

*Primary Examiner* — Jelani Smith
*Assistant Examiner* — Jordan S Fei
(74) *Attorney, Agent, or Firm* — Brinks Gilson & Lione

(57) ABSTRACT

Autonomous diesel vehicles and control methods thereof are disclosed. An autonomous vehicle may include a peripheral information collecting unit configured to collect peripheral information necessary for autonomous travelling through an image camera and a laser scanner, a main control unit configured to control the autonomous travelling with reference to the peripheral information collected by the peripheral information collecting unit, a passenger monitoring unit configured to check whether a passenger exists inside the vehicle through a sensor and transmit a result of the check to the main control unit, and an engine control unit configured to control driving of an engine and injection of fuel of an injector according to a control instruction of the main control unit. When the passenger is inside the vehicle, the main control unit performs a pilot injection control, and when the passenger is not inside the vehicle, the main control unit omits the pilot injection control.

14 Claims, 6 Drawing Sheets

(51) Int. Cl.
 *F02D 29/02* (2006.01)
 *F02D 41/02* (2006.01)
(52) U.S. Cl.
 CPC .... *F02D 2200/60* (2013.01); *F02D 2200/701* (2013.01); *Y02T 10/44* (2013.01)

(56) References Cited

U.S. PATENT DOCUMENTS

2014/0114539 A1\* 4/2014 Ando ................ F02D 35/00
 701/51
2016/0116293 A1\* 4/2016 Grover ................ G01C 21/34
 701/23

FOREIGN PATENT DOCUMENTS

KR 1020130137395 12/2013
KR 101449210 10/2014

\* cited by examiner

<Fuel control logic when passenger exists>

FIG. 3

Injection area of pilot 1

|  | 0 | 150 | 400 | 500 | 600 | 700 | 800 | 900 | 1000 | 1200 | 1400 | 1600 | 1800 | 2000 | 2400 | 2800 |
|---|---|---|---|---|---|---|---|---|---|---|---|---|---|---|---|---|
| 800 | 0.8 | 0.8 | 0.83 | 0.83 | 0.83 | 0.84 | 0.84 | 0.84 | 0.84 | 0.84 | 0.84 | 0.84 | 0.84 | 0.84 | 0.84 | 0.84 |
| 1000 | 0.8 | 0.8 | 0.85 | 0.98 | 0.9 | 1.03 | 1.04 | 1.03 | 1 | 0.9 | 0.9 | 0.9 | 0.9 | 0.9 | 0.9 | 0.9 |
| 1250 | 0.8 | 0.82 | 1.02 | 1.08 | 1.1 | 1.1 | 1.09 | 1.09 | 1.08 | 1.06 | 1.06 | 1.06 | 1 | 1 | 1 | 1 |
| 1500 | 0.8 | 0.82 | 1.09 | 1.13 | 1.15 | 1.15 | 1.14 | 1.13 | 1.1 | 1.08 | 1.06 | 1.06 | 1.04 | 1.04 | 1.04 | 1.04 |
| 1750 | 0.8 | 0.82 | 1.09 | 1.15 | 1.16 | 1.16 | 1.16 | 1.15 | 1.14 | 1.13 | 1.13 | 1.14 | 1.13 | 1.13 | 1.16 | 1.2 |
| 2000 | 0.83 | 0.83 | 1.03 | 1.1 | 1.14 | 1.16 | 1.18 | 1.19 | 1.19 | 1.18 | 1.16 | 1.16 | 1.17 | 1.18 | 1.24 | 1.3 |
| 2250 | 0.86 | 0.86 | 1.04 | 1.08 | 1.11 | 1.13 | 1.16 | 1.18 | 1.19 | 1.2 | 1.23 | 1.24 | 1.25 | 1.27 | 1.36 | 1.4 |
| 2500 | 0.9 | 0.9 | 1.08 | 1.11 | 1.14 | 1.16 | 1.19 | 1.2 | 1.22 | 1.23 | 1.27 | 1.29 | 1.33 | 1.38 | 1.48 | 1.52 |
| 2750 | 0 | 0.92 | 1.11 | 1.15 | 1.17 | 1.2 | 1.2 | 1.23 | 1.25 | 1.29 | 1.37 | 1.42 | 1.47 | 1.52 | 1.6 | 1.6 |
| 3000 | 0 | 0.94 | 1.14 | 1.7 | 1.19 | 1.2 | 1.21 | 1.25 | 1.29 | 1.41 | 1.52 | 1.57 | 1.6 | 1.6 | 1.6 | 1.6 |
| 3250 | 0 | 0.94 | 1.14 | 1.2 | 1.22 | 1.23 | 1.24 | 1.28 | 1.34 | 1.4 | 1.4 | 1.4 | 1.4 | 1.4 | 1.4 | 1.4 |
| 3500 | 0 | 0.94 | 1.14 | 1.2 | 1.22 | 1.23 | 1.24 | 1.28 | 1.37 | 1.4 | 1.4 | 1.4 | 1.4 | 0 | 0 | 0 |
| 3600 | 0 | 0.94 | 1.14 | 1.2 | 1.22 | 1.23 | 1.24 | 1.28 | 1.37 | 1.4 | 1.4 | 1.4 | 1.4 | 0 | 0 | 0 |
| 3800 | 0 | 0.94 | 1.14 | 1.2 | 1.22 | 1.23 | 1.24 | 1.28 | 1.37 | 1.4 | 1.4 | 1.4 | 1.4 | 0 | 0 | 0 |
| 4000 | 0 | 0 | 0 | 0 | 0 | 0 | 0 | 0 | 0 | 0 | 0 | 0 | 0 | 0 | 0 | 0 |
| 4500 | 0 | 0 | 0 | 0 | 0 | 0 | 0 | 0 | 0 | 0 | 0 | 0 | 0 | 0 | 0 | 0 |

- Engine speed (rpm) — row labels
- Engine load IMEP(kpa) — column headers
- Amount of fuel injected (mg/str) — cell values Injection area of pilot 2

|  | 0 | 150 | 400 | 500 | 600 | 700 | 800 | 900 | 1000 | 1200 | 1400 | 1600 | 1800 | 2000 | 2400 | 2800 |
|---|---|---|---|---|---|---|---|---|---|---|---|---|---|---|---|---|
| 800 | 1.2 | 1.2 | 1.2 | 1.2 | 1.24 | 1.29 | 1.36 | 1.41 | 1.46 | 1.49 | 1.52 | 1.52 | 1.52 | 1.52 | 1.52 | 1.52 |
| 1000 | 1.2 | 1.2 | 1.23 | 1.31 | 1.37 | 1.42 | 1.48 | 1.54 | 1.57 | 1.59 | 1.6 | 1.58 | 1.58 | 1.58 | 1.58 | 1.58 |
| 1250 | 1.2 | 1.2 | 1.31 | 1.39 | 1.45 | 1.5 | 1.56 | 1.58 | 1.6 | 1.62 | 1.65 | 1.67 | 1.69 | 1.7 | 1.7 | 1.7 |
| 1500 | 1.2 | 1.2 | 1.36 | 1.45 | 1.53 | 1.6 | 1.65 | 1.67 | 1.68 | 1.68 | 1.67 | 1.67 | 1.72 | 1.73 | 1.8 | 1.8 |
| 1750 | 1.2 | 1.2 | 1.41 | 1.56 | 1.65 | 1.69 | 1.73 | 1.72 | 1.73 | 1.7 | 1.68 | 1.7 | 1.72 | 1.79 | 1.95 | 2 |
| 2000 | 1.2 | 1.2 | 1.53 | 1.62 | 1.69 | 1.73 | 1.73 | 1.73 | 1.73 | 1.63 | 1.59 | 1.64 | 1.67 | 1.75 | 2.07 | 2.2 |
| 2250 | 1.2 | 1.2 | 1.57 | 1.66 | 1.73 | 1.77 | 1.71 | 1.73 | 1.73 | 1.63 | 1.61 | 1.63 | 1.7 | 1.81 | 2.17 | 2.4 |
| 2500 | 1.2 | 1.2 | 1.62 | 1.7 | 1.77 | 1.82 | 1.73 | 1.73 | 1.74 | 1.62 | 1.65 | 1.67 | 1.79 | 1.94 | 2.38 | 2.5 |
| 2750 | 0 | 1.2 | 1.66 | 1.76 | 1.81 | 1.87 | 1.79 | 1.77 | 1.8 | 1.76 | 1.82 | 1.87 | 2.01 | 2.08 | 2.47 | 2.5 |
| 3000 | 0 | 1.2 | 1.68 | 1.8 | 1.86 | 1.89 | 1.89 | 1.89 | 1.89 | 1.96 | 2.08 | 2.08 | 2.1 | 2.1 | 2.1 | 2.1 |
| 3250 | 0 | 1.2 | 1.73 | 1.84 | 1.86 | 1.91 | 1.94 | 1.98 | 2.03 | 2.04 | 2.1 | 2.1 | 2.1 | 2.1 | 2.1 | 2.1 |
| 3500 | 0 | 1.2 | 1.73 | 1.84 | 1.86 | 1.91 | 1.94 | 1.98 | 2.03 | 2.06 | 2.1 | 2.1 | 2.1 | 1.7 | 1.7 | 1.7 |
| 3600 | 0 | 1.2 | 1.73 | 1.84 | 1.86 | 1.91 | 1.94 | 1.98 | 2.03 | 2.06 | 2.1 | 2.1 | 2.1 | 0 | 0 | 0 |
| 3800 | 0 | 1.2 | 1.73 | 1.84 | 1.86 | 1.91 | 1.94 | 1.98 | 2.03 | 2.06 | 2.1 | 2.1 | 2.1 | 0 | 0 | 0 |
| 4000 | 0 | 0 | 0 | 0 | 0 | 0 | 0 | 0 | 0 | 0 | 0 | 0 | 0 | 0 | 0 | 0 |
| 4500 | 0 | 0 | 0 | 0 | 0 | 0 | 0 | 0 | 0 | 0 | 0 | 0 | 0 | 0 | 0 | 0 |

AUTONOMOUS VEHICLE AND CONTROL METHOD THEREOF

CROSS-REFERENCE TO RELATED APPLICATION

This application claims priority to and the benefit of Korean Patent Application No. 10-2015-0063361 filed on May 6, 2015, the entire contents of which are incorporated herein by reference.

FIELD

The present disclosure relates to autonomous vehicles and a control methods thereof, and more particularly, to autonomous vehicles that use diesel as a fuel, and methods of controlling autonomous travelling.

BACKGROUND

In general, an autonomous vehicle (also referred to as an unmanned vehicle) is a vehicle capable of monitoring external information and recognizing a road situation and autonomously travelling to a set destination by itself without manipulation of a vehicle owner.

Further, due to a characteristic of a larger noise than a gasoline vehicle, a diesel vehicle using diesel as a fuel performs pilot injection control which causes deterioration of fuel efficiency for a silent and comfortable driving environment.

Here, the pilot injection decreases an ignition delay time of main injection by injecting fuel with a small time difference before the main injection for generating operation power of the vehicle to facilitate combustion. The pilot injection control injects a small amount of fuel before the main injection, so that fuel efficiency may slightly deteriorate, but noise and vibration of a diesel engine may be decreased through the decrease of fuel efficiency.

However, when an autonomous diesel vehicle is unmannedly operated, quiet driving by decreasing a noise of the diesel engine is meaningless because there is no passenger inside the vehicle, and this causes a problem in that fuel efficiency is unnecessarily degraded through the pilot control. Further, it is difficult for a pedestrian to recognize a vehicle when engine noise of the autonomous diesel vehicle is small, so that there is a problem in that a danger of an accident is increased.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide systems and methods of injecting fuel for an autonomous diesel vehicle, which restricts pilot injection of an engine when an autonomous diesel vehicle unmannedly and autonomously travels to decrease unnecessary consumed fuel, and intentionally increases engine noise to enable a pedestrian to easily recognize a vehicle autonomously travelling in an unmanned state.

An exemplary form of the present invention provides an autonomous vehicle, including: a peripheral information collecting unit configured to collect peripheral information necessary for autonomous travelling through an image camera and a laser scanner; a main control unit configured to control the autonomous travelling with reference to the peripheral information collected by the peripheral information collecting unit; a passenger monitoring unit configured to check whether a passenger exists inside the vehicle through a sensor and transmit a result of the check to the main control unit; and an engine control unit configured to control driving of an engine and injection of fuel of an injector according to a control instruction of the main control unit, in which when the passenger exists, the main control unit performs pilot injection control, and when the passenger does not exist, the main control unit omits the pilot injection control.

When the passenger exists, the main control unit may transmit to the engine control unit a first control instruction for performing the pilot injection control in a fuel control logic injecting fuel to a diesel engine, and when the passenger does not exist, the main control unit may transmit to the engine control unit a second control instruction for omitting the pilot injection control in the fuel control logic to.

The autonomous vehicle may further include a communication unit configured to transceive autonomous travelling operation information including at least one of an autonomous travelling start command, destination information, and vehicle owner location information with a vehicle owner terminal located at a remote place.

Further, the main control unit may set an autonomous travelling route to a set destination or a location at which the vehicle owner is located, through an analysis of the autonomous travelling operation information received from the vehicle owner terminal at the remote place.

The main control unit may transmit movement location information of the vehicle and expected destination arrival information calculated by a navigation system to the vehicle owner terminal at the remote place through the communication unit while the autonomous vehicle unmannedly and autonomously travels.

The main control unit may transmit a peripheral image obtained by the peripheral information collecting unit to the vehicle owner terminal at the remote place and provide a vehicle owner with a location at which the autonomous vehicle is unmannedly and autonomously travelling, and a road situation when the autonomous vehicle unmannedly and autonomously travels.

The passenger monitoring unit may be formed of at least one of a carbon dioxide sensor, a piezoelectric sensor of a seat, an infrared sensor, and an indoor camera inside the vehicle to detect whether a passenger exists inside the vehicle.

Another exemplary form of the present invention provides a method of controlling autonomous travelling of an autonomous diesel vehicle using diesel as a fuel, including: a) when autonomous travelling operation information is received from a vehicle owner terminal located at a remote place, analyzing the received autonomous travelling operation information, starting on a diesel engine, and setting an autonomous travelling route; b) checking whether a passenger exists inside the vehicle through a passenger monitoring unit; c) when the passenger exists, performing pilot injection control, and when the passenger does not exist, omitting the pilot injection control; and d) performing autonomous travelling to a set destination by recognizing peripheral information for autonomous travelling.

Operation c) may include: c-1) when the passenger exists, transmitting a first control instruction for performing the pilot injection control in a fuel control logic injecting fuel to the diesel engine to an engine control unit, and c-2) when the passenger does not exist, transmitting a second control instruction for removing the pilot injection control in the fuel control logic to the engine control unit.

Operation d) may include transmitting at least one of movement location information of the vehicle, an expected destination arrival time, and peripheral image information photographed through a camera to the vehicle owner terminal, and notifying a vehicle owner of an autonomous travelling situation.

According to the exemplary embodiment of the present invention, when a passenger exists in an autonomous diesel vehicle, it is possible to provide a silent and comfortable driving environment through the pilot injection, and when the autonomous diesel vehicle unmannedly and autonomously travels in a state where a passenger does not exist, it is possible to restrict the unnecessary pilot injection control, thereby improving fuel efficiency.

Further, when the vehicle unmannedly and autonomously travels, it is possible to intentionally generate an engine noise by omission of the pilot injection, thereby enabling a pedestrian to easily recognize the vehicle and preventing an accident with a person.

Further areas of applicability will become apparent from the description provided herein. It should be understood that the description and specific examples are intended for purposes of illustration only and are not intended to limit the scope of the present disclosure.

DRAWINGS

FIG. 3 illustrates an example of injection areas of two pilot injectors of the autonomous diesel vehicle.

Figure 1:
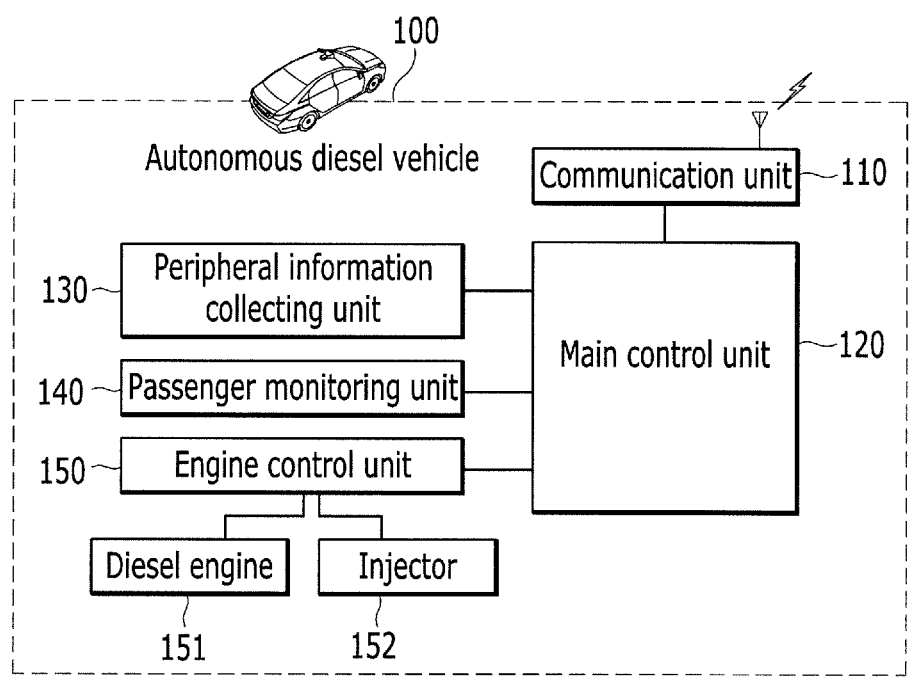
FIG. 1 is a block diagram schematically illustrating a configuration of an autonomous diesel vehicle.

The drawings described herein are for illustration purposes only and are not intended to limit the scope of the present disclosure in any way.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, an autonomous diesel vehicle according to an exemplary embodiment of the present invention and a method of controlling the same will be described in detail with reference to the accompanying drawings.

FIG. 1 is a block diagram schematically illustrating a configuration of an autonomous diesel vehicle.

Referring to FIG. 1, an autonomous diesel vehicle 100 according to an exemplary embodiment of the present invention includes a communication unit 110, a main control unit 120, a peripheral information collecting unit 130, a passenger monitoring unit 140, and an engine control unit 150.

The communication unit 110 includes a vehicle owner terminal located at a remote place and a communication module for transceiving autonomous travel operation information. Here, the vehicle owner terminal may be a smart key to which an unmanned and autonomous travel operating function is added, or a portable terminal of a vehicle owner in which a program capable of remotely controlling a vehicle is mounted. Further, the autonomous travel operating information may include an autonomous travel start command, destination information, vehicle owner location information, and the like.

The main control unit 120 is a computer device in which hardware and software for controlling a general operation of the autonomous diesel vehicle 100 are combined.

When the main control unit 120 receives the autonomous travel operating information through the communication unit 110, the main control unit 120 starts the autonomous diesel vehicle to control autonomous travel.

The main control unit 120 sets an autonomous travelling route to a set destination or a location at which the vehicle owner is located through an analysis of the autonomous travel operation information, and initiates autonomous travelling with reference to the information collected by the peripheral information collecting unit 130.

Here, the peripheral information collecting unit 130 includes an image camera capable of recognizing a road sign for autonomous travelling, a global positioning system (GPS), and a laser scanner, and collects peripheral information for autonomous travelling and provides the collected peripheral information to the main control unit 120. Accordingly, the main control unit 120 may perform autonomous travelling while recognizing a traffic sign and road information, and evade a passing vehicle or adjust a speed in accordance with a speed limit. In addition, the main control unit 120 may adjust an inter-vehicle distance during the travelling, or recognize a road, a lane, an obstacle, and the like based on the information collected by the peripheral information collecting unit 130.

Further, the main control unit 120 may transmit movement location information of the vehicle and expected destination arrival information calculated by an audio video navigation (AVN) system to the vehicle owner terminal through the communication unit 110 during the autonomous travelling.

Further, the main control unit 120 may transmit an image photographed by the peripheral information collecting unit 130 through a camera to the vehicle owner terminal, and provide the vehicle owner with peripheral information such as a location at which the vehicle is autonomously travelling, and a road situation, when the vehicle owner terminal requests the peripheral information.

The passenger monitoring unit 140 checks whether a passenger currently exists inside the vehicle through a sensor and transmits a result of the check to the main control unit 120.

For example, the passenger monitoring unit 140 may be formed of at least one of a carbon dioxide ($CO_2$) sensor, a piezoelectric sensor of a seat, an infrared sensor, and an indoor camera within the vehicle, and detect whether a passenger exists inside the vehicle.

In the meantime, the main control unit 120 may determine whether to perform pilot injection control according to the existence or non-existence of the passenger inside the vehicle while the vehicle autonomously travels.

In this case, when the main control unit 120 confirms that the passenger exists inside the vehicle through the passenger monitoring unit 140, the main control unit 120 transmits to the engine control unit 150 a first control instruction for normally performing the pilot injection control in a fuel control logic injecting fuel to a diesel engine 151.

In the meantime, when the main control unit 120 confirms that the passenger does not exist inside the vehicle through the passenger monitoring unit 140, the main control unit 120 transmits to the engine control unit 150 a second control instruction for removing (omitting) the pilot injection control in the fuel control logic.

The engine control unit 150 controls driving of the diesel engine 151 and fuel injection of an injector 152 according to the control instruction of the main control unit 120.

In the meantime, a normal pilot injection control of the engine control unit 150 and a method of removing the pilot injection control for the purpose of improving fuel efficiency during unmanned travelling will be described with reference to FIGS. 2 to 4.

Figure 2:
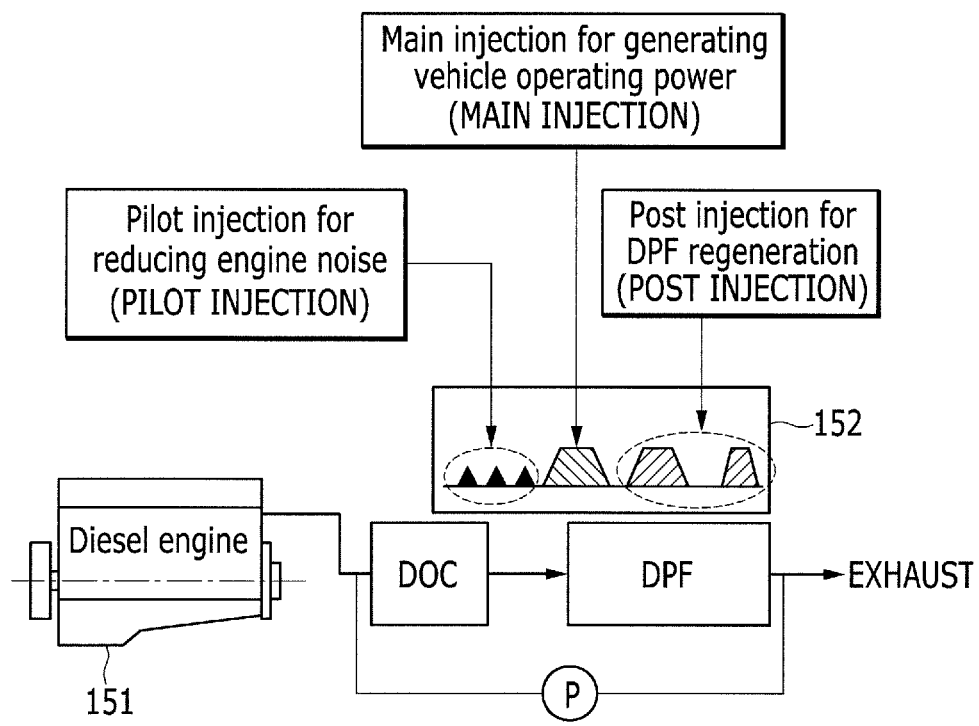
FIG. 2 is a diagram schematically illustrating fuel control logic of the autonomous diesel vehicle.

FIG. 2 is a diagram schematically illustrating fuel control logic of the autonomous diesel vehicle.

FIG. 3 illustrates an example of injection areas of two pilot injectors of the autonomous diesel vehicle.

Referring to FIGS. 2 and 3, the engine control unit 150 performs the pilot injection control according to the first instruction applied when a travelling mode is not the autonomous travelling mode or is a manned autonomous travelling mode, in which a passenger exists.

That is, the engine control unit 150 controls the pilot injection with a small time difference before main injection generating operating power of the vehicle.

In this case, the engine control unit 150 controls the pilot injection a plurality of times, so that the amount of fuel injection other than the main injection may be increased, but engine noise and vibration and harshness (NVH) may be reduced.

Figure 4:
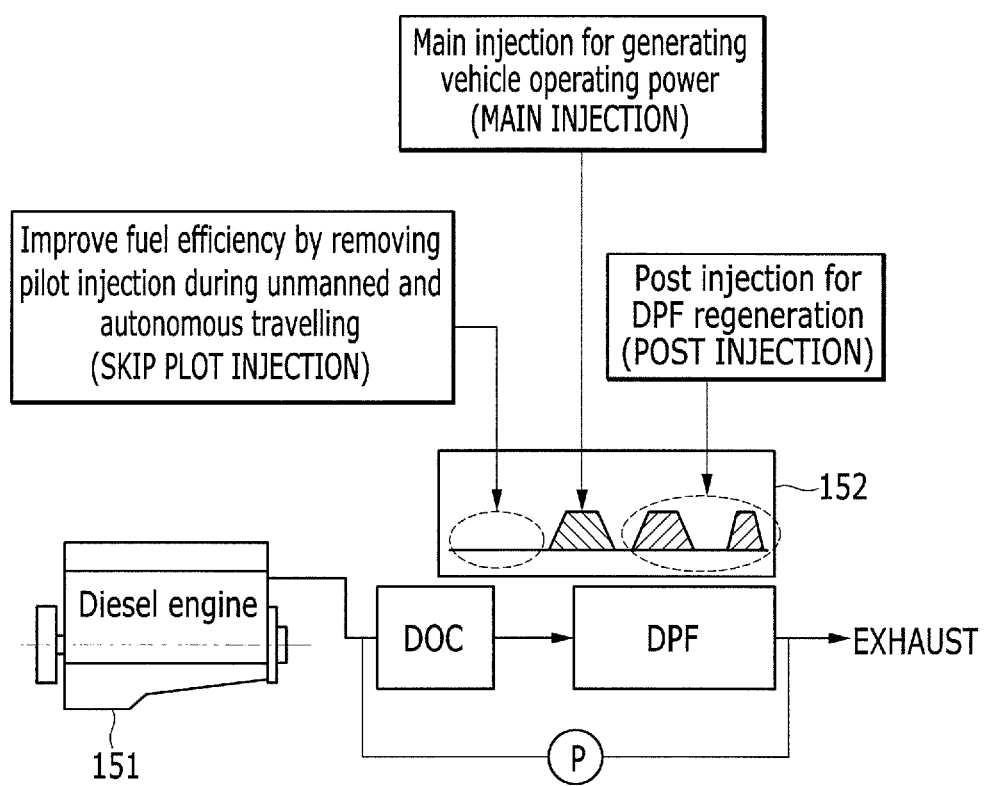
FIG. 4 is a diagram schematically illustrating fuel control logic when the autonomous diesel vehicle unmannedly and autonomously travels.

FIG. 4 is a diagram schematically illustrating the fuel control logic when the autonomous diesel vehicle unmannedly and autonomously travels.

Referring to FIG. 4, the engine control unit 150 according to the exemplary embodiment of the present invention omits the pilot injection control according to the second instruction applied in the unmanned autonomous travelling mode, in which a passenger does not exist inside the vehicle, and controls the fuel injection of the injector 152.

In this case, a noise and a vibration are more generated in the diesel engine 151 by the removal of the pilot injection control, compared to the case where the pilot injection control is performed, but there is no passenger, so that fuel consumption may be reduced.

Figure 5:
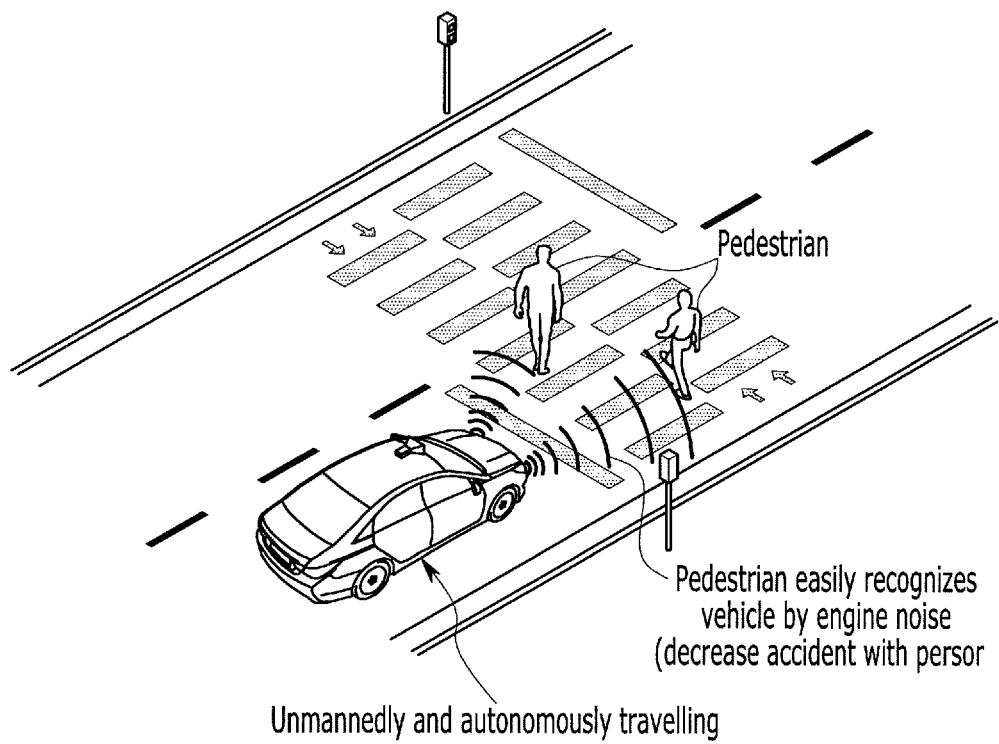
FIG. 5 is a diagram illustrating a relation between an increase of a noise of a diesel engine according to removal of the pilot injection and a pedestrian.

FIG. 5 is a diagram illustrating a relationship between an increase of noise of the diesel engine according to the removal of the pilot injection and a pedestrian.

As illustrated in FIG. 5, when the autonomous diesel vehicle removes the pilot injection so that engine noise is increased during the unmanned autonomous travelling, a pedestrian may easily recognize the vehicle by the increased engine noise, thereby preventing an accident with a person.

A fuel injection method based on the aforementioned configuration of the fuel injection system of the autonomous diesel vehicle 100 according to the exemplary embodiment of the present invention will be described with reference to FIG. 6.

Figure 6:
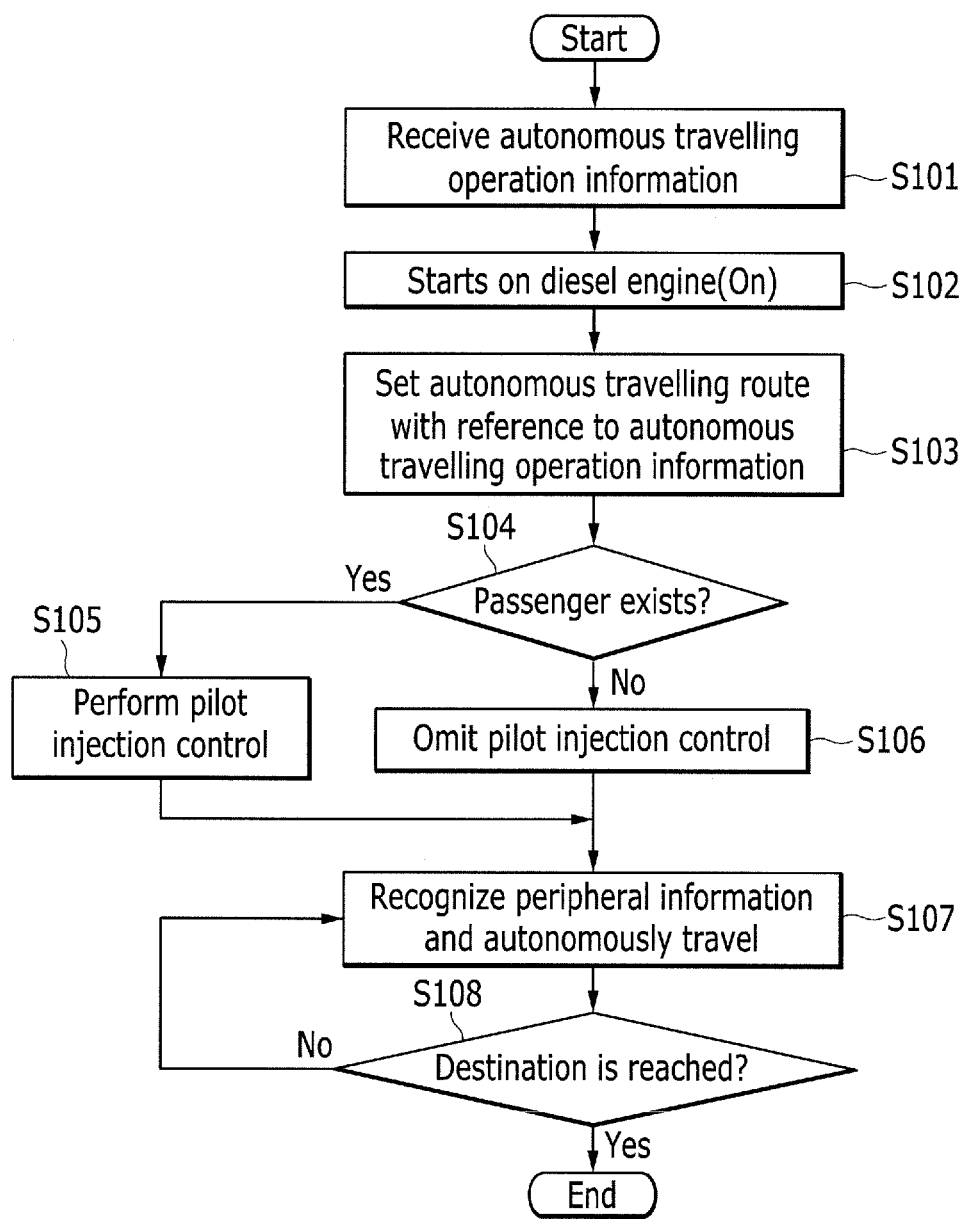
FIG. 6 is a flowchart schematically illustrating a method of controlling pilot injection.

FIG. 6 is a flowchart schematically illustrating a method of controlling fuel injection of the autonomous diesel vehicle.

Referring to FIG. 6, when the autonomous diesel vehicle 100 receives autonomous travelling operation information from a vehicle owner terminal located at a remote place, the autonomous diesel vehicle 100 analyzes the received autonomous travelling operation information (S101), and starts the diesel engine 151 (S102).

The autonomous diesel vehicle 100 sets an autonomous travelling route from a current location of the vehicle (GPS) with reference to a set destination in the autonomous travelling operation information or a location at which a vehicle owner is located (S103). For example, when the vehicle owner calls the autonomous diesel vehicle 100 in a state where the autonomous diesel vehicle 100 is parked at a parking lot, the autonomous diesel vehicle 100 may set an unmanned autonomous travelling route to a place at which the vehicle owner is located.

The autonomous diesel vehicle 100 checks whether a passenger exists inside the vehicle through the passenger monitoring unit 140, and when there is a passenger (S104, Yes), the autonomous diesel vehicle 100 performs pilot injection control through the engine control unit 150 (S105). In this case, the main control unit 120 may perform the pilot injection control by transmitting a first control instruction including the pilot injection control logic to the engine control unit 150, and then perform main injection.

However, when there is no passenger inside the vehicle (S104, No), the autonomous diesel vehicle 100 omits the pilot injection control and controls the main injection (S106). In this case, the main control unit 120 may omit the pilot injection control by transmitting to the engine control unit 150 a second control instruction in which the pilot injection is removed, and immediately perform the main injection.

The autonomous diesel vehicle 100 recognizes peripheral information for the autonomous travelling through the peripheral information collecting unit 130 and performs the autonomous travelling to the set destination (S107). In this case, although not illustrated, the autonomous diesel vehicle 100 transmits at least one of movement location information about the vehicle, an expected destination arrival time calculated by an audio video navigation (AVN) system, and peripheral image information photographed by the camera to the vehicle owner terminal through the communication unit 110, and notifies the vehicle owner of an autonomous travelling situation.

When the autonomous diesel vehicle 100 arrives the destination through the autonomous travelling (S108, Yes), the autonomous diesel vehicle 100 terminates the autonomous travelling.

Then, when the vehicle owner or another passenger gets in the vehicle and initiates travelling by the vehicle owner or the autonomous travelling, the autonomous diesel vehicle 100 may perform the pilot control according to the existence of the passenger in operation S104.

As described above, according to the exemplary form of the present invention, when a passenger exists, the autonomous diesel vehicle may provide a silent and comfortable driving environment through the pilot injection, and when the autonomous diesel vehicle unmannedly and autonomously travels in a state where a passenger does not exist, it is possible to restrict the unnecessary pilot injection control, thereby improving fuel efficiency.

Further, when the vehicle unmannedly and autonomously travels, it is possible to intentionally generate engine noise by the omission of the pilot injection, thereby enabling a pedestrian to easily recognize the vehicle and thus preventing an accident with a person.

The exemplary form of the present invention is not only implemented by the aforementioned apparatus and/or method, but may be implemented by a program for operating a function corresponding to the configuration of the exemplary embodiment of the present invention, a recording medium in which the program is recorded, and the like, and the implementation may be easily realized from the description of the aforementioned exemplary embodiment by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: Autonomous diesel vehicle
110: Communication unit
120: Main control unit
130: Peripheral information collecting unit
140: Pedestrian monitoring unit
150: Engine control unit
151: Diesel engine
152: Injector

What is claimed is:

1. An autonomous vehicle, comprising:
 a peripheral information collecting unit including an image camera and a laser scanner, the peripheral information collecting unit configured to collect peripheral information;
 a passenger monitoring unit configured to:
  determine whether a passenger is detected inside the autonomous vehicle through a sensor; and
  transmit a result of the determination whether the passenger is detected inside the autonomous vehicle;
 a main control unit configured to:
  receive the result from the passenger monitoring unit;
  when the result indicates the passenger is detected inside the autonomous vehicle, provide a first control instruction;
  when the result indicates the passenger is not detected inside the autonomous vehicle, provide a second control instruction; and
 an engine control unit configured to:
  perform a pilot injection control when the first control instruction is received from the main control unit; and
  remove the pilot injection control when the second control instruction is received from the main control unit.

2. The autonomous vehicle of claim 1, wherein
 the pilot injection control is performed by a fuel control logic injecting fuel to a diesel engine, and
 wherein removing the pilot injection control is performed by the fuel control logic.

3. The autonomous vehicle, of claim 1, further comprising a communication unit configured to transceive autonomous travelling operation information including at least one of an autonomous travelling start command, destination information, and vehicle owner location information with a vehicle owner terminal located at a remote place.

4. The autonomous vehicle, of claim 3, wherein
 the main control unit is configured to set an autonomous travelling route to a set destination or a location at which a vehicle owner is located through an analysis of the autonomous travelling operation information received from a vehicle owner terminal at the remote place.

5. The autonomous vehicle of claim 4, wherein
 the main control unit is configured to transmit movement location information of the vehicle and expected destination arrival information calculated by a navigation system to the vehicle owner terminal at the remote place while the autonomous vehicle unmannedly and autonomously travels.

6. The autonomous vehicle of claim 5, wherein
 the main control unit is configured to transmit a peripheral image obtained by the peripheral information collecting unit to the vehicle owner terminal at the remote place, and provide a vehicle owner with a location at which the autonomous vehicle is unmannedly and autonomously travelling and a road situation when the autonomous vehicle unmannedly and autonomously travels.

7. The autonomous vehicle, of claim 1, wherein
 the main control unit is configured to set an autonomous travelling route to a set destination or a location at which a vehicle owner is located through an analysis of autonomous travelling operation information received from a vehicle owner terminal at a remote place.

8. The autonomous vehicle of claim 7, wherein
 the main control unit is configured to transmit movement location information of the vehicle and expected destination arrival information calculated by a navigation system to the vehicle owner terminal at the remote place through the communication unit while the autonomous vehicle unmannedly and autonomously travels.

9. The autonomous vehicle of claim 8, wherein
 the main control unit is configured to transmit a peripheral image obtained by the peripheral information collecting unit to the vehicle owner terminal at the remote place, and provide a vehicle owner with a location at which the autonomous vehicle is unmannedly and autonomously travelling and a road situation when the autonomous vehicle unmannedly and autonomously travels.

10. The autonomous vehicle of claim 1, wherein
 the passenger monitoring unit is formed of at least one of a carbon dioxide sensor, a piezoelectric sensor of a seat, an infrared sensor, and an indoor camera inside the autonomous vehicle to detect whether a passenger exists inside the vehicle.

11. A method of controlling autonomous travelling of an autonomous diesel vehicle using diesel as fuel, comprising:
 when autonomous travelling operation information is received from a vehicle owner terminal located at a remote place, analyzing the received autonomous travelling operation information, starting a diesel engine, and setting an autonomous travelling route;

collecting, by a peripheral information collecting unit, peripheral information;

determining, by a passenger monitoring unit, whether a passenger is detected inside the autonomous diesel vehicle;

upon a determination that the passenger is detected inside the autonomous diesel vehicle, performing pilot injection control on the diesel engine;

upon a determination that the passenger is not inside the autonomous diesel vehicle, removing the pilot injection control on the diesel engine; and performing autonomous travelling to a set destination based on the peripheral information.

12. The method of claim 11, wherein performing pilot injection control comprises:

upon a determination that the passenger is inside the autonomous diesel vehicle, transmitting to an engine control unit a control instruction for performing the pilot injection control in a fuel control logic injecting fuel to the diesel engine.

13. The method of claim 11, wherein omitting the pilot injection control comprises:

upon a determination that the passenger is not inside the autonomous diesel vehicle, transmitting to the engine control unit a control instruction for removing the pilot injection control in the fuel control logic.

14. The method of claim 11, wherein performing autonomous travelling to the set destination comprises:

transmitting at least one of movement location information of the autonomous diesel vehicle, an expected destination arrival time, and peripheral image information photographed by a camera to the vehicle owner terminal, or notifying a vehicle owner of an autonomous travelling situation.

\* \* \* \* \*